United States Patent Office 3,116,655
Patented Jan. 7, 1964

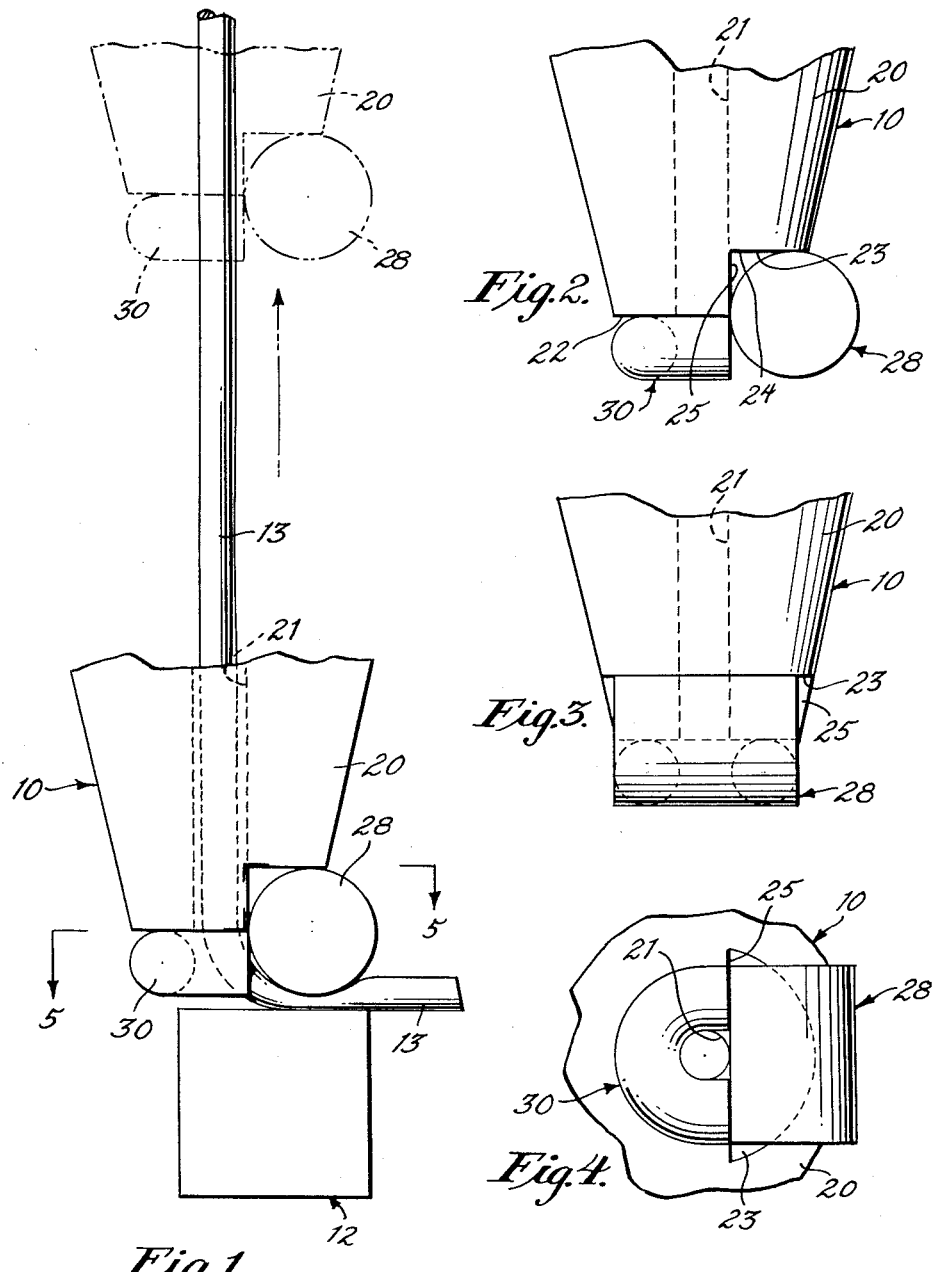

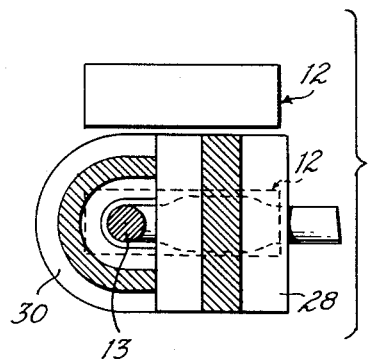
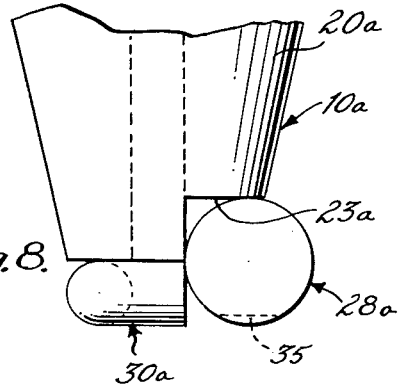
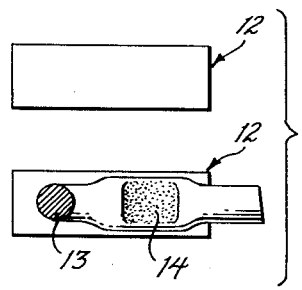
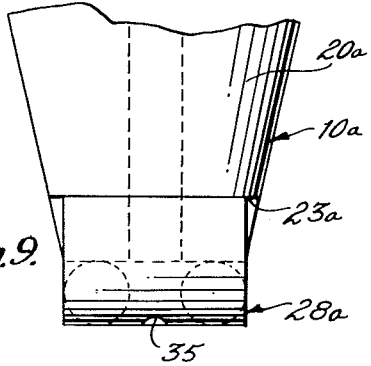
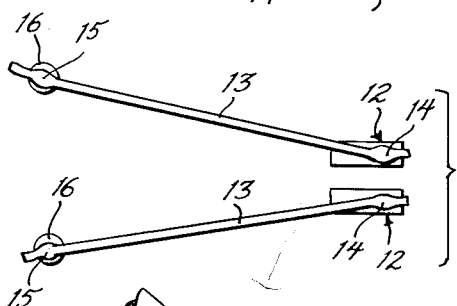
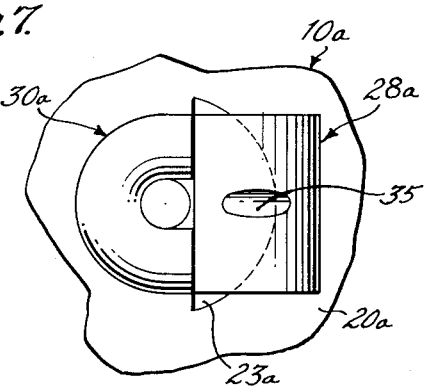
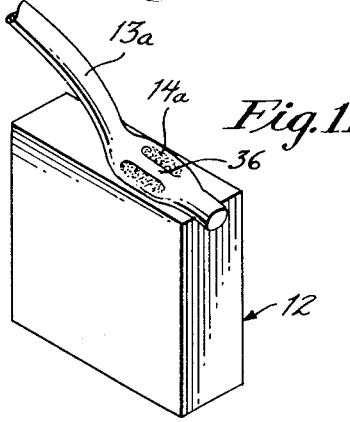
INVENTOR.
ALDO J. ESOPI
BY Robertson and Youtie
ATTORNEYS

3,116,655
TOOL FOR WELDING MINUTE WIRE
CONNECTIONS
Aldo J. Esopi, 604 N. Main St., R.D. 2, Wilkes-Barre, Pa.
Filed Sept. 12, 1962, Ser. No. 223,005
6 Claims. (Cl. 78—82)

This invention relates to improvements in welding tools, and is especially concerned with tools for making minute welds as in the manufacture of transistors and the like.

As is well known, the welding of wires in transistors, as between the wafers and posts is a very tedious and time-consuming manual operation, necessarily performed under optical magnification. In addition, even with skilled operators there is a high incidence of defective product.

It is therefore an important object of the present invention to provide a highly improved welding tool for making minute welds, which makes the welding operation more efficient, less tedious and time consuming, and whereby is produced a stronger and more durable weld.

The instant invention also contemplates the provision of a welding tool of the type described which is relatively durable and long-wearing, and can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is an elevational view, greatly enlarged, showing in solid lines the welding operation by the instant tool, and illustrating withdrawal of the tool in phantom, all parts being considerably enlarged;

FIGURE 2 is a partial side elevational view showing the tool of the instant invention apart from the welding operation;

FIGURE 3 is an elevational view taken from the right-hand side of FIGURE 2;

FIGURE 4 is a lower-end view of the tool of FIGURE 2;

FIGURE 5 is a sectional view taken substantially along the line 5—5 of FIGURE 1;

FIGURE 6 is a sectional view similar to FIGURE 5, but with the tool removed to its phantom position;

FIGURE 7 is a diagrammatic representation of the internal connections of a transistor;

FIGURE 8 is a side elevational view similar to FIGURE 2, but showing a slightly modified embodiment of the instant invention;

FIGURE 9 is an elevational view taken from the right-hand side of FIGURE 8;

FIGURE 10 is a lower-end view of the tool of FIGURE 8; and

FIGURE 11 is a perspective view showing a weld formed by the tool of FIGURES 8–10.

Referring now more particularly to the drawings, and specifically to FIGURE 1 thereof, wherein a welding tool of the present invention is there generally designated 10, and shown in position welding a wire 13 to the upper edge of a wafer 12.

By way of example, in FIGURE 7 is shown the internal arrangement of a transistor, a pair of wafers 12 being shown in upstanding, spaced side-by-side relation, to the upper edges of which are respectively welded wires 13. That is, one end region of each wire 13 is welded, as at 14, to the upper edge of a respective wafer 12. The other end of each wire 13 is welded, as at 15 to a respective connection post 16. This structure is conventional in transistors, and is embedded in a body of covering material.

By way of illustration as to the minuteness of size, the wafers 12 may each be of a thickness approximately .002 inch, and may be of generally square configuration in elevation, approximately .006 inch on a side. Further, the spacing between the pair of wafers 12 is on the order of about .002 inch. Of course, the wire 13 is quite fine, and extreme precision is required to weld the fine wire to the relatively narrow wafer edge. The difficulty is compounded by the close spacing of the wafers which requires that each wire be welded to its respective wafer without any contact of the other wafer.

The tool 10 is best seen in FIGURES 2–4, as comprising a tubular bit 20 having an internal, longitudinally extending through opening 21 and having its external surface tapering toward its working end 22, downward as seen in FIGURES 2 and 3. The tubular bit 20 may advantageously be fabricated of stainless steel, or other suitable material. Any suitable handle means (not shown) may be provided on the upper end of the bit 20.

The externally tapering bit 20 is truncated at its lower or working end 22, defining thereof a generally annular end face, through which the bore or hole 21 opens. Further, the bit end face 22 is chordally recessed, as at 23, by the milling out or other removal of a segmental portion. That is, the recess 23 extends transversely across the bit 20 at the working end thereof, opening laterally and longitudinally outward from the bit. The recess is thus in the form of a notch as seen in FIGURE 2, being located on one side of the bore 21 and defined between a longitudinally outwardly facing shoulder 24, and a longitudinally extending, laterally outwardly facing, or chordal side wall 25. The shoulder 23 is thus offset longitudinally inward from the bit end surface 22.

A welding tip 28 extends chordally across the working end of the bit 10, being located in the recess 23 and fixedly secured to the bit, as by cement or other suitable means. The welding tip 28 is thus located on one side of the through bore or opening 21, and may be of generally cylindrical formation as illustrated, say being formed of tungsten wire. Of course, the welding tip 28 may also be fabricated of carbide or other suitable material. The transverse or diametral size of tip 28 may be relatively great, so as to project longitudinally outward beyond the end surface 22 and afford a relatively broad welding area, as will appear presently. By way of example, the recess 23 may be approximately .002 inch deep, setting back the shoulder approximately .002 inch from the end surface 22; and, the cylindrical welding tip 28 may have a diameter approximating .004 inch so as to project approximately .002 inch outward beyond the bit end surface 22.

An auxiliary tip or wear member is shown at 30, and may be of generally U-shaped configuration, best seen in FIGURE 4. The auxiliary tip 30 may advantageously be fabricated of bent tungsten wire, but may also be of other suitable materials, such as carbide or the like. In its U-shaped configuration, the auxiliary tip 30 is cemented, welded or otherwise fixedly secured to the bit end surface 22, extending partially about the bit opening or bore 21.

The auxiliary tip 30 may substantially completely cover the bit end surface 21, as from the end view of FIGURE 4, with opposite ends of the U-shaped auxiliary tip proximate to opposite ends of the chordal tip 28. The bit opening 21 thus remains substantially unobstructed, for a purpose appearing presently.

By way of example, the bit opening 21 may have a diameter approximately .0015 inch, for loosely receiving and passing therethrough the wire 13. The tip 30 may be fabricated of wire approximately .002 inch diameter, so as to have its outer surface, remote from the bit 10, approximately flush with the surface of tip 28 longitudinally remote from the bit.

In operation, the wire 13 to be welded passes downward through the bit 10, loosely through the opening 21 and outward across and beyond the tip 28. The wire normally assumes this disposition of extending across the underside of tip 28 by reason of being previously so trained and severed. Also, the tool is heated by any suitable means, such as electric heating elements, or otherwise.

The tool is lowered to the position shown in FIGURE 1, to press the wire 13 between the welding tip 28 and upper edge of wafer 12. By heat and pressure, the wire is deformed or flattened to produce the weld 14, see FIGURE 6. The tool 10 is then raised, say to the phantom position of FIGURE 1 and moved to proper location over a post 16, where it is lowered and the wire again welded, as at 15. That is, the tool 10 is lowered to engage the wire between a post 16 and the tip 28 to effect welding of the wire to the post. The tool may then be raised away from the post 16 and the wire severed between the weld 15 and tool, preferably training the wire across the tip 28 during severing.

It has been found, by the relatively great diameter of welding tip 28, that a more satisfactory weld is produced. That is, the relative flatness of the welding surface produces a weld of greater area and, hence, greater strength.

In addition, the tip 30 prevents wear of the bit 20, and may also serve as a welding tip should the wire jump out of its normal position extending across the underside of tip 28.

In the embodiment of FIGURES 8–11, there is shown a tool 10a having a bit 20a and a tip 30a, all of which may be substantially identical to the correspondingly numbered parts of the first-described embodiment. However, a generally cylindrical, chordal tip 28a is fixedly secured in the recess 23a of bit 20a, and the chordal tip is provided on its outer surface remote from the bit with a grooved formation 35. That is, extending transversely across the underside of generally cylindrical welding tip 28a is the open-ended, downwardly facing groove 35. The groove serves both to aid in properly locating the wire 13a, see FIGURE 11, for welding, and to form a weld 14a having a ribbed configuration, such as the rib 36, for additional strength of the weld.

From the foregoing, it is seen that a welding tool for use in manufacture of transistors and the like is provided which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A tool for welding minute wire connections, said tool comprising a tubular bit having one end open for outward feeding therethrough of wire to be welded, a welding tip fixedly secured to said one bit end and extending chordally thereacross on one side of the bit opening, and a generally U-shaped auxiliary tip fixedly secured to said one bit end and extending about the other side of said bit opening.

2. A tool according to claim 1, said first tip being of generally cylindrical configuration, and said auxiliary tip having its ends terminating proximate to said first tip, whereby said first and auxiliary tips substantially surround said bit opening.

3. A tool according to claim 1, said first and auxiliary tips being of generally circular cross section, and said first tip having a dimeter considerably greater than that of said auxiliary tip.

4. A tool for welding minute wire connections, said tool comprising a tubular bit having one end open for outward feeding therethrough of wire to be welded, and a welding tip fixedly secured to said one bit end and extending chordally thereacross on one side of said bit opening, said bit tapering externally to said one end, and said one bit end being provided with a chordal recess receiving said welding tip.

5. A tool according to claim 4, said tip being provided with a nonsmooth welding surface remote from said bit.

6. A tool according to claim 4, said tip being provided with a groove facing away from said bit for forming a rib in wire being welded.

References Cited in the file of this patent

UNITED STATES PATENTS 2,986,625    Houda    May 30, 1961
3,083,595    Frank    Apr. 2, 1963

FOREIGN PATENTS 891,956    Germany    Oct. 1, 1953